(12) United States Patent
Hergenrother et al.

(10) Patent No.: US 9,540,503 B2
(45) Date of Patent: Jan. 10, 2017

(54) KERATIN IN RUBBER APPLICATIONS

(71) Applicant: Bridgestone Corporation, Tokyo (JP)

(72) Inventors: William L. Hergenrother, Akron, OH (US); Lorri L. Shultz, Akron, OH (US); Chenchy Jeffrey Lin, Hudson, OH (US)

(73) Assignee: Bridgestone Corporation, Tokyo (JP)

( * ) Notice: Subject to any disclaimer, the term of this patent is extended or adjusted under 35 U.S.C. 154(b) by 81 days.

(21) Appl. No.: 14/492,835

(22) Filed: Sep. 22, 2014

(65) Prior Publication Data
US 2015/0011683 A1    Jan. 8, 2015

Related U.S. Application Data

(62) Division of application No. 13/367,416, filed on Feb. 7, 2012, now Pat. No. 8,841,361.

(60) Provisional application No. 61/440,143, filed on Feb. 7, 2011.

(51) Int. Cl.
| | |
|---|---|
| *C08L 89/00* | (2006.01) |
| *C08L 9/06* | (2006.01) |
| *C08K 3/36* | (2006.01) |
| *C08K 3/04* | (2006.01) |
| *C08L 7/00* | (2006.01) |
| *C08L 9/00* | (2006.01) |
| *C08L 21/00* | (2006.01) |
| *B60C 1/00* | (2006.01) |
| *C08L 89/04* | (2006.01) |
| *C08K 5/053* | (2006.01) |
| *C08K 5/548* | (2006.01) |

(52) U.S. Cl.
CPC ............... *C08L 9/06* (2013.01); *B60C 1/0016* (2013.04); *C08K 3/04* (2013.01); *C08K 3/36* (2013.01); *C08L 7/00* (2013.01); *C08L 9/00* (2013.01); *C08L 21/00* (2013.01); *C08L 89/04* (2013.01); *C08K 5/053* (2013.01); *C08K 5/548* (2013.01); *Y02T 10/862* (2013.01)

(58) Field of Classification Search
CPC .............. C08L 89/00; C08L 9/06; C08K 3/36; C08K 3/04
USPC ........................ 524/21, 571, 575.5; 525/54.1
See application file for complete search history.

(56) References Cited

U.S. PATENT DOCUMENTS

| | | | | |
|---|---|---|---|---|
| 2005/0065265 A1* | 3/2005 | Zanzig | ................. | B60C 1/0016 524/445 |
| 2006/0089447 A1* | 4/2006 | Robertson | ................. | B60C 1/00 524/493 |
| 2008/0236716 A1* | 10/2008 | Bergman | .............. | B60C 1/0016 152/517 |

OTHER PUBLICATIONS

Barone, Justin et al., "Extrusion of Feather Keratin", J. Appl. Polym. Sci., vol. 100, pp. 1432-1442 (2006).*
Varghese, Silby, "Studies on short sisal fibre reinforced natural rubber composites" Thesis, Chapter 1, Mahatma Gandhi University (Submit Date Aug. 2, 2010).

* cited by examiner

*Primary Examiner* — Bijan Ahvazi
*Assistant Examiner* — Ronald Grinsted
(74) *Attorney, Agent, or Firm* — Meredith E. Hooker; Nathan T. Lewis

(57) ABSTRACT

A rubber composition includes an elastomer having an elongation at break (Eb) of about 50% or more according to ASTM-D 412 at 25° C., a water-insoluble keratin, and a reinforcing filler. A tire component including the composition and a method for making the composition are also disclosed.

18 Claims, 1 Drawing Sheet

KERATIN IN RUBBER APPLICATIONS

CROSS-REFERENCE TO RELATED APPLICATION

This application is a divisional of U.S. Ser. No. 13/367,416, titled "Keratin in Rubber Applications," filed Feb. 7, 2012, which in turn claims priority to provisional application 61/440,143, titled "Keratin in Rubber Applications," filed Feb. 7, 2011, the entire disclosures of each of the above are incorporated herein by reference.

FIELD

This disclosure relates to rubber compositions that contain keratin, and to tires having at least one component thereof comprising such rubber compositions, including for example, a tread component.

BACKGROUND

Rubber goods such as tire treads often are made from elastomeric compositions that contain one or more reinforcing fillers such as, for example, particulate carbon black and silica; see, e.g. The Vanderbilt Rubber Handbook, 13$^{th}$ ed. (1990), pp. 603-04.

There is continuing interest to provide tires with a high level of handling, steering response, and low fuel consumption. A common method of increasing the steering response of the tire is to use a tread rubber with high stiffness. High stiffness compounds typically have a high dynamic storage modulus (G'). Conventional compounding techniques used to increase the dynamic storage modulus include using a high filler loading, using a filler with a high surface area, and using less softener. However, each of these conventional methods has performance and processing, tradeoffs.

For example, the above mentioned conventional techniques can increase the hysteresis of the rubber compound. Increasing the hysteresis of the rubber results in more energy loss as heat, and thus increases fuel consumption.

In addition, increasing the flier loading, using a filler with a high surface area, and lowering the softener level can have a negative effect on processing, as each of these increases the time it takes to disperse the filler into the rubber and increases the viscosity of the rubber composition.

SUMMARY

In an embodiment a rubber composition includes: an elastomer having an elongation at break (Eb) of about 50% or more according to ASTM-D 412 at 25° C.; a water-insoluble keratin; and a reinforcing filler.

In another embodiment a tire includes a rubber composition component that comprises: (a) a conjugated diene elastomer having an elongation at break (Eb) of about 50% or more according to ASTM-D 412 at 25° C.; and (b) keratin, wherein the keratin is substantially water insoluble.

In another embodiment, a method comprises mixing together: (a) an elastomer having an elongation at break (Eb) of about 50% or more according to ASTM-D 412 at 25° C., and (b) keratin, wherein the keratin is substantially water insoluble.

DETAILED DESCRIPTION

Figure 1:
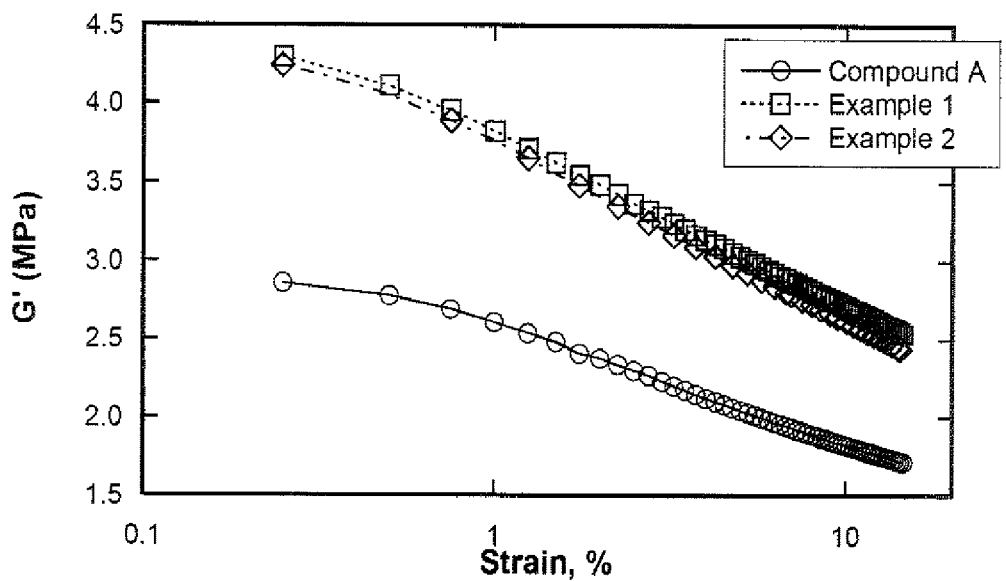
FIG. 1 illustrates a graph showing dynamic storage modulus as a function of strain for Examples 1-2.

The present disclosure is directed toward the use of keratin as a filler in rubber compositions. The utilization of keratin in conjunction with one or more coupling agents in rubber compositions results in increased dynamic storage modulus (G') without significantly increasing the Mooney viscosity ($ML_4$) or otherwise affecting the physical properties of the compounds. An embodiment of the compounds disclosed herein utilizes ground avian feather or feather meal as a keratin-containing filler. Avian feathers and feather meal are a renewable resource. Avian feather meal has a significantly higher bulk density than ground feather and is easier to handle during the manufacturing process. Such compounds are easy to process, cost effective, and environmentally friendly. Furthermore, the use of even a small amount of avian feathers and feather meal in a rubber compound also allows the reduction in the amount of non-renewable fillers such as carbon black.

Keratin is a protein that contains all of the common amino acids and differs from other fibrous structural proteins chiefly by their high cysteine content. The sulfur atoms in the cysteine produce cross-links between the protein chains that contribute to some of the characteristics of the material. Keratin, either as avian feathers or feather meal, is a high melting, tough, inexpensive, non toxic, renewable material that is light weight and biodegradable. Typical fillers for rubber compositions, such as carbon black, silica, alumina, clay and starch do not possess these characteristics.

Keratin can be sub-divided into two types: $\alpha$-keratin and $\beta$-keratin. Alpha-keratins are found in the hair (including wool), horns, nails, claws and hooves of mammals. Beta-keratins are present in the nails, scales, and claws of reptiles, shells of tortoises, turtles, and terrapins, and in the feathers, beaks, and claws of birds and quills of porcupines.

Beta-keratin is harder than $\alpha$-keratin and contains higher amounts of stacked $\beta$ pleated sheets, in comparison to alpha-keratin. Beta pleated sheets are beta strands connected laterally by at least two or three backbone hydrogen bonds, forming a generally twisted, pleated sheet. Alpha keratin, instead, is rich in alpha helices.

Keratin, particularly beta-keratin, can be derived from avian feather quill and fibers. Various types of avian feathers can be used, including those of chickens and other fowl. Each year, the United States poultry industry discards about 70% of the 4 billion pounds of chicken feathers generated (Parkinson, G., *Chem. Engineering*, 105(3), 21 (1998)). The remainder of the feathers have small usage as feather meal.

Keratin also exists in hydrolyzed and unhydrolyzed forms. In addition, keratin can be water-soluble or water-insoluble. In some embodiments, the keratin used in the rubber compositions is water-insoluble, unlike the keratin described in U.S. Pat. No. 5,587,411, which is water-soluble and is pre-dispersed in an aqueous latex.

Although, many different forms of keratin can be used in rubber compositions, particularly useful in the embodiments described herein are the beta-keratin forms derived from feathers, including ground chicken feathers or chicken feather meal. Keratin from feathers has a high melting point, is relatively inexpensive, non toxic, and a renewable material that is light weight and biodegradable. The keratin used in an embodiment of the present composition includes particles and/or fibers having a diameter of about 1 µm to about 500 µm, or about 5 µm to about 200 µm, or about 10

μm to about 100 μm and lengths of about 0.05 mm to about 10 mm, or about 0.01 mm to about 5 mm, or about 5 mm to about 50 mm. Suitable feather meal has the same ranges of useful diameters and lengths as described above, and in some embodiments has a pellet size of about ⅛ of an inch. As feathers are ground and compressed into feather meal the long keratin fibers are reduced to less than about 3 mm, but the fiber diameter is substantially unaffected by the compression.

Feather meal useful in the present disclosure can be produced by extruding feathers with a small amount of one or more processing aids to reduce crystalline content and fiber length. This extrusion of feathers with processing aids produces feather meal which has significantly higher bulk density than that of ground feathers and thereby allows for easier handling during the rubber composition manufacturing process. The processing aid(s) can be any material capable of producing extrudate that does not negatively affect the desired properties of the rubber composition. Non-limiting examples of these keratin processing aids include alcohols, (such as glycerol and sorbitol), water, sodium sulfite and combinations thereof.

Additionally, feather meal can be used as a carrier for other ingredients included in the rubber composition. For example, feather meal can be processed to act as a carrier for coupling agents commonly used in rubber compositions. Use of ground feather or feather meal as a carrier for other rubber composition ingredients may further improve the properties of the rubber composition.

According to the present disclosure, feather meal or ground feathers can be added to the rubber composition in an amount of from about 1 phr to about 100 phr, about 2 to about 30 phr, about 3 to about 60 phr, about 4 phr to about 50 phr, about 5 phr to about 20 phr, or about 10 phr to about 30 phr.

Feather meal or ground feathers can be pre-dispersed into synthetic and/or natural rubbers or can be directly incorporated into the composition using conventional mixing equipment. This equipment may include Banbury® mixers, roll mills, and twin screw extruders.

The rubber composition may be compounded by, for example, mixing the various sulfur-vulcanizable constituent rubbers with various commonly used additive materials such as, for example, curatives, processing additives such as oils, resins including tackifying resins, fillers, pigments, fatty acid, zinc oxide, waxes, antioxidants and antiozonants and peptizing agents. In an embodiment the composition is exclusive of cellulose.

In one embodiment, the vulcanizable rubber compositions of this disclosure are compounded with other fillers in addition to the keratin. The rubber compositions of this disclosure are preferably compounded with reinforcing fliers, such as carbon black, silica, or mixtures thereof. In an embodiment, carbon black and/or silica are used as filler, and they may be used exclusively or in combination with other reinforcing or non-reinforcing fillers. These other fillers can include but are not limited to starch, aluminum hydroxide, magnesium hydroxide, clays, and short fibers such as cellulose, aramid, nylon and polyester.

In an embodiment, the use of keratin allows for a reduction in the amount of other fillers typically used in rubber compositions. For example, lower than typical amounts of other fillers may be used, such as about 5 to about 50 phr, about 15 to about 41 phr, or about 20 to about 30 phr.

The rubber compositions of the present disclosure generally contain one or more elastomers. Non-limiting examples of these elastomers include, natural rubber, synthetic poly- isoprene rubber, styrene/butadiene rubber (SBR), polybutadiene rubber, styrene-isoprene rubber, isoprene-butadiene rubber, styrene-isoprene-butadiene rubber, butyl rubbers, halobutyl rubbers, ethylene propylene rubbers, crosslinked polyethylene, neoprenes, styrene-isoprene-butadiene, styrene nitrile rubbers, chlorinated polyethylene rubbers, silicone rubbers, specialty heat & oil resistant rubbers, other specialty rubbers and thermoplastic rubbers, as such terms are employed in *The Vanderbilt Rubber Handbook*, Thirteenth Edition, (1990). In an embodiment, the elastomers include natural rubber, synthetic isoprene, styrene-butadiene copolymers, and butadiene rubber. In an embodiment, the rubber compositions are elastomers having an elongation at break of about 50% or more, such as about 50% to about 1000%, about 75% to about 500%, or about 150% to about 400%.

A coupling agent or one or more coupling agents may be used to chemically bind the keratin to the rubber and also to chemically bind other fillers, including silica with the rubber. For example, coupling agents such as those having a silane group and a constituent component or moiety that can react with the rubber. The coupling agent thus acts as a connecting bridge between the keratin or other filler and rubber. Numerous coupling agents may be used, including, but not limited to organosilane polysulfides, organoalkoxymercaptosilanes, glycidyl silanes, and glycidyl propyl silanes.

Suitable organosilane polysulfides include, but are not limited to, 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trmethoxysilylpropyl)trisulfide, 3,3'-bis(triethoxysilylpropyl)tetrasulfide, 3,3'-bis(tributoxysilylpropyl)disulfide, 3,3'-bis(trimethoxysilylpropy) hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxyslylpropyl)trisulfide, 3,3'-bis(trisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricycloneoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tretrasulfide, 3-methoxyethoxypropoxysilyl 3'-diethoxybutoxy-silylpropyl tetrasulfide, 2,2'-bis(dimethylmethoxysilylethyl)disulfide, 2,2'-bis(dimethylsecbutoxysilylethyl) trisulfide, 3,3'-bis(methylbutylethoxysilylpropyl)tetrasulfide, 3,3'-bis(di t-butylmethoxysilylpropyl) tetrasulfide, 2,2'-bis(phenylmethylmethoxysilylethyl)trisulfide, 3,3'-bis(diphenyl isopropoxysilypropyl)tetrasulfide, 3,3'-bis(diphenylcyclohexoxysilylpropyl)disulfide, 3,3'-bis(dimethyethylmercaptosilylpropyl)tetrasulfide, 2,2'-bis(methyldimethoxysilylethyl)trisulfide, 2,2'-bis(methyl ethoxypropoxysilylethyl)tetrasulfide, 3,3'-bis(diethylmethoxysilylpropyl)tetrasulfide, 3,3'-bis(ethyldi-secbutoxysilylpropyl)disulfide, 3,3'-bis(propyldiethoxysilylpropyl) disulfide, 3,3'-bis(butyldimethoxysilylpropyl)trisulfide, 3,3'-bis(phenyldimethoxysilylpropyl)tetrasulfide, 3'-trimethoxysilylpropyl tetrasulfide, 4,4'-bis(trimethoxysilylbutyl)tetrasulfide, 6,6"-bis(triethoxysilylhexyl)tetrasulfide, 12,12'-bis (trifsopropoxysilyl dodecyl)disulfide, 18,18'-bis trimethoxysilyloctadecyl)tetrasulfide, 18,18'-bis(tripropoxysilyloctadecenyl)tetrasulfide, 4,4'-bis(trimethoxysilylbuten-2-yl)tetrasulfide, 4,4'-bis(trimethoxysilyloyclohexylene)tetrasulfide, 5,5'-bis(dimethoxymethylsilylpentyl)trisulfide, 3,3'-bis(trimethoxysilyl-2-methylpropyl)tetrasulfide and 3,3'-bis(dimethoxyphenylsilyl-2-methylpropyl)disulfide.

Suitable organoalkoxymercaptosilanes include, but are not limited to, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diiscpropoxy mercaptopropylsilane, ethoxy didodecyloxy mercaptopropylsilane and ethoxy dihexadecyloxy mercaptopropylsilane. An example of a capped organoalkoxymercaptosilane coupling agent is a liquid 3-octanoylthio-1-propyltriethoxysilane, available as NXT™ Silane from the GE Silicones Company.

Mixtures of various organosilane polysulfide compounds and/or organoalkoxymercaptosilanes can be used.

The silane or other coupling agent may be present, for example, in amounts ranging from about 0.1 to about 20 phr, about 1 phr to about 10 phr, and about 2 phr to about 6 phr. The coupling agent may be present in an amount of about 1% to about 100% silane relative to filler by weight, about 10% to about 50% silane relative to filler by weight or about 5% to about 25% silane relative to filler by weight.

When present, the amount of processing additives may be from about 1 to about 60 phr, such as about 2 phr to about 10 phr, or about 3 phr to about 8 phr. Such processing additives may include, for example, aromatic, naphthenic, and/or paraffinic processing oils. Typical amounts of antioxidants may comprise from about 1 to about 10 phr. Representative antioxidants may be, for example, diphenyl-p-phenylenediamine, TMQ, and others such as, for example, those disclosed in *The Vanderbilt Rubber Handbook* (1978), pages 344-346. Typical amounts of antiozonants, such as N-(1,3-dimethylbutyl)-N'-phenyl-1,4-benzene diamine (6PPD), may be, for example, from about 1 to about 10 phr. Typical amounts of fatty acids, if used, which can include stearic acid, may be, for example, from about 0.5 to about 6 phr. Typical amounts of zinc oxide may be, for example, from about 1 to about 8 phr. Typical amounts of wax, such as microcrystalline wax, may, for example, range from about 1 to about 8 phr.

The amount of peptizer used, when present, may be, for example, about 0.1 to about 3 phr. The peptizers may be, for example, pentachlorothiophenol and dibenzamidodiphanyl disulfide.

Process aids may also act as tackifiers, such as phenolic resin, which may be present, for example, in an amount of about 2 to about 5 phr. C5 aliphatic hydrocarbon resin, which may be present, for example, in an amount of about 3 to about 8 phr may also be useful.

The vulcanization is conducted in the presence of a sulfur vulcanizing agent. Examples of suitable sulfur vulcanizing agents include elemental sulfur (free sulfur) or sulfur donating vulcanizing agents, for example, amine disulfide, polymeric polysulfide, or sulfur olefin adducts. Sulfur vulcanizing agents may be used in an amount ranging from about 0.5 to about 8 phr.

Accelerators are used to control the time and/or temperature required for vulcanization and to improve the properties of the vulcanizate. In one embodiment, a single accelerator system may be used, which in such case would comprise a primary accelerator. A primary accelerator is used, for example, in total amounts ranging from about 0.5 to about 5 phr. In another embodiment, combinations of a primary and a secondary accelerator might be used with the secondary accelerator being used in smaller amounts, such as about 0.05 to about 3 phr, in order to activate and to improve the properties of the vulcanizate. In addition, delayed action accelerators may be used which are not affected by normal temperatures. Vulcanization retarders might also be used. Suitable types of accelerators that may be used are amines, disulfides, guanidines, thioureas, thiurams, sulfonamides, dithiocarbamates, xanthates, and sulfonamides. The primary accelerator may also be a thiazole, such as a benzothiazole-based accelerator. Exemplary benzothiazole-based accelerators may include N-cyclohexyl-2-benzothiazole sulfonamide (CBS), N-tert-butyl-2-benzothiazole sulfenamide (TBBS), 4-oxydiethylene-2-benzothiazole sulfenamide (OBTS), N,N'-dicyclohexyll-2-benzothiazole sulfenamide (OCBS), 2-mercaptobenzothiazole (MBT), and dibenzothiazole disulfide (MBTS), and such accelerators may be present in an amount of from about 0.1 to about 6 phr.

The present disclosure will be described in more detail with reference to the following examples. The following examples are presented for purposes of illustration only and are not to be construed in a limiting sense.

Examples 1-2

Three rubber compositions were prepared using the formulation shown in Table 1. Example 1 and Example 2 contain 10 phr of water insoluble ground chicken feather and Example 2 also contains 2 phr of 3-glycidoxy propyl-trimethoxy silane coupling agent. Composition Example A is a control, and is representative of a carbon black filled tread composition that does not contain keratin.

The compositions were mixed in two stages. For the first non-productive mix stage, the ingredients were mixed for approximately 4 minutes to a temperature of about 153° C. The resulting rubber composition was mixed with sulfur curatives and accelerators to a maximum temperature of 103° C. for about 2 minutes in a final, productive mix stage.

Samples of each of these compositions were vulcanized at a temperature of about 171° C. for about 15 minutes. Selected physical properties for the resulting vulcanized elastomeric compositions are shown in Table 3.

TABLE 1

Elastomer Composition Formulations

| Material | Comp. A | Ex. 1. | Ex. 2 |
|---|---|---|---|
| Non-Productive | | | |
| Styrene/butadiene rubber[1] | 100 | 100 | 100 |
| Carbon black[2] | 41 | 41 | 41 |
| Antioxidant | 0.95 | 0.95 | 0.95 |
| Zinc Oxide | 2.5 | 2.5 | 2.5 |
| Ground chicken feather[3] | 0 | 10 | 10 |
| 3-glycidoxy propyl-trimethoxy silane | 0 | 0 | 2 |
| Wax | 1 | 1 | 1 |
| Productive | | | |
| Sulfur | 1.3 | 1.3 | 1.3 |
| N-Cyclohexyl-2-benzothiazolesulfenamide | 1.7 | 1.7 | 1.7 |
| Diphenylguanidine | 0.2 | 0.2 | 0.2 |

[1]SBR (23.5% styrene, 47% Vinyl, Tg −36° C.)
[2]N343
[3]Supplied by Tyson Foods, ground in a ball mill.

TABLE 2

Uncured Compound Properties

| Compound | Comp. A | Ex. 1 | Ex. 2 |
|---|---|---|---|
| $ML_4$ @ 130° C. (Mooney Viscosity) | 46 | 49.7 | 48.4 |
| $T_5$ | 23.2 | 21.7 | 23.7 |

The processing of the compositions was evaluated by examining compound viscosity. Mooney viscosities for the resulting uncured rubber compositions are shown in Table 2. Mooney viscosity of the compositions was determined in accordance with ASTM 0-1646. The Compound Mooney ML 1+4 130° C. refers to Mooney viscosity of the uncured compounds at 130° C. The $T_5$ is the time required to increase 5 Mooney units during the Mooney-scorch measurement. It was surprising to find that with the addition of 10 phr of keratin on stocks 2 and 3, the Mooney only increases moderately. This increase is much smaller than what occurs with the addition of other rigid fillers with comparable loading into rubber, and it is still acceptable for processing.

TABLE 3

Cured Composition Properties

| | Comp. A | Ex. 1 | Ex. 2 |
|---|---|---|---|
| Dynamic Properties Modulus- Temperature Sweep | | | |
| G' @ 25° C. MPa | 5.8 | 11.5 | 12.0 |
| G' @ 50° C. MPa | 4.6 | 9.9 | 9.7 |
| Modulus- Strain Sweep at 50° C. | | | |
| G' 2% MPa | 2.38 | 3.49 | 3.41 |
| G' 5% MPa | 2.05 | 3.03 | 2.95 |
| Viscoelastic Properties Temperature Sweep | | | |
| 0° C. tan δ | 0.3049 | 0.2693 | 0.2547 |
| 50° C. tan δ | 0.1449 | 0.1417 | 0.1483 |
| Dynastat | | | |
| 0° C. tan δ | 0.2754 | 0.2354 | 0.2302 |
| 50° C. tan δ | 0.1469 | 0.1513 | 0.1617 |
| Stanley London | 53.4 | 54.2 | 53.7 |
| Mechanical Properties Ring Tensile @ 25° C. | | | |
| Eb (%) | 353 | 291 | 334 |
| Ring Tensile tested @ 25° C. heat aged 100° C. 24 hrs | | | |
| Eb (%) | 318 | 247 | 284 |

The dynamic viscoelastic mechanical properties were obtained from temperature sweep experiments conducted with a frequency of 5.0 Hz using 0.5% strain over the temperature range of from −100° C. to −20° C., and 2% strain for the temperature range of from −20° C. to 100° C. The 50° C. tangent delta measurements were also obtained from the strain sweep measurements at a strain level of 2%. A frequency of 0.5 Hz was used for strain sweep which is conducted at 50° C. and at 0° C. with strain ranging from 0.25% to 14.75%.

The other viscoelastic properties were measured by using the dynamic compression test and rebound tests. The sample geometry used for the dynamic compression tests was a cylindrical button with 9.5 mm in diameter and 15.6 mm in length. The sample was compressed under a static load of 2 kg before testing. After it reached an equilibrium state, the test began with a compression load of 1.25 kg at a frequency of 1 Hz. The sample was then dynamically compressed and then extended and the resultant displacement and tangent were recorded.

The tensile mechanical properties reported in Table 3 were measured using the standard procedure described in the ASTM-D 412 at 25° C. Samples with two different geometries were used for the tests. Samples in the form of round rings with an inner diameter of 15.5 mm, an outer diameter of 18.0 mm, and a thickness of 1.91 mm were prepared for procuring ring tensile test data. A specific gauge length of 25.4 mm was used for the tensile tests. A portion of the ring samples were thermally aged at 100° C. for two days prior to testing.

As may be seen from the data contained in Table 2, the Mooney viscosity of the compound is only slightly affected by the addition of keratin. For compounds in which keratin was added, the dynamic storage modulus (G') of such compounds was more than 2 times the values for compounds that did not contain keratin. Other properties such as tangent delta at 50° C. were not significantly affected by the addition of the keratin into the rubber compound.

As can be seen from the mechanical properties in Table 2, addition of coupling agent to keratin containing rubber compositions increased Mooney and $T_5$ properties of the compositions.

Example 3

Example 3, in contrast to Examples 1 and 2, used water insoluble chicken feather meal as the source of the keratin in the compound. Two rubber compositions were prepared using the formulation shown in Table 4. Example 3 contains 10 phr of water-insoluble chicken feather meal, and Composition B is a control composition without any chicken feather meal.

The compositions were mixed in two stages. For the first non-productive mix stage, the ingredients were mixed for approximately 5-10 minutes to a temperature of about 140-160° C. The resulting rubber composition was mixed with sulfur curatives and accelerators to a maximum temperature of 110° C. for about two minutes in a final, productive mix stage. Curing was done at 171° C. for 15 minutes.

Mooney viscosity for the resulting green rubber compositions are shown in Table 5. Selected physical properties for the resulting vulcanized elastomer compositions are shown in Table 6.

TABLE 4

Elastomer Composition Formulations

| Material | Comp. B | Ex. 3. |
|---|---|---|
| Non-Productive | | |
| Styrene/butadiene rubber[4] | 100 | 100 |
| Carbon black[5] | 41 | 41 |
| Antioxidant | 0.95 | 0.95 |
| Zinc Oxide | 2.5 | 2.5 |
| Chicken feather meal[6] | 0 | 10 |
| Wax | 1 | 1 |
| Productive | | |
| Sulfur | 1.3 | 1.3 |
| N-Cyclohexyl-2-benzothiazolesulfenamide | 1.7 | 1.7 |
| Diphenylguanidine | 0.2 | 0.2 |

[4]SBR (23.5% Styrene, 8% Vinyl, Tg −62° C.)
[5]N343
[6]Granulated Feather Meal by Pacific Calcium Inc.

TABLE 5

Green Compound Properties

| Compound | Comp. B | Ex. 3 |
|---|---|---|
| $ML_4$ @ 130° C. (Mooney Viscosity) | 57 | 61 |
| $T_5$ | 19.4 | 18.3 |

The processing of the rubber compounds of Example 3 and Comparative Example B was evaluated by examining the compound Mooney (Table 5). Mooney viscosity measurement was conducted at 130° C. using a large rotor. The Mooney viscosity was recorded as the torque when rotor has rotated for 4 minutes. The examples were preheated at 133° C. for 1 minute before the rotor started. $T_5$ is the time required to increase 5 Mooney units during the Mooney-scorch measurement,

TABLE 6

Cured Composition Properties

| | Comp. B | Ex. 3 |
|---|---|---|
| Dynamic Properties Modulus- Temperature Sweep | | |
| G' @ 25° C. MPa | 5.4 | 6.43 |
| G' @ 50° C. MPa | 4.42 | 5.32 |
| Modulus- Strain Sweep at 50° C. | | |
| G' 2% MPa | 2.73 | 3.03 |
| G' 5% MPa | 2.35 | 2.64 |
| Viscoelastic Properties Temperature Sweep | | |
| 0° C. Tan Delta | 0.1837 | 0.1823 |
| 50° C. Tan Delta | 0.1402 | 0.1328 |
| Dynastat | | |
| 0° C. Tan Delta | 0.1976 | 0.1968 |
| 50° C. Tan Delta | 0.1469 | 0.1383 |
| Stanley London | 53.8 | 56.8 |
| Elongation at Break | | |
| Eb % (Ring Tensile @ 25 C.) | 428 | 296 |

The dynamic viscoelastic mechanical properties were obtained from temperature sweep (tmp swp) experiments conducted with a frequency of 31.4 red/sec using 0.5% strain for temperature ranging from −100° C. to −20° C., and 2% strain for the temperature ranging from −20° C. to 100° C. A 2% strain was employed for the measurement. The 50° C. Sand data were also obtained from the strain sweep (str swp) measurements at a strain level of 2%. A frequency of 3.14 red/sec was used for strain sweep which was conducted at 50° C. and 0° C. with strain sweeping from 0.25% to 14.75%.

The other viscoelastic properties were measured by using dynamic compression test and rebound tests. The sample geometry used for dynamic compression test was a cylindrical button with a 9.5 mm diameter and 15.6 mm length. The samples were compressed under a static load of 2 kg before testing. After it reached an equilibrium state, the test started with a dynamic compression iced of 1.25 kg at a frequency of 1 Hz. The sample was then dynamically compressed and then extended and the resultant hysteresis (tan δ) were then recorded.

Figure 2:
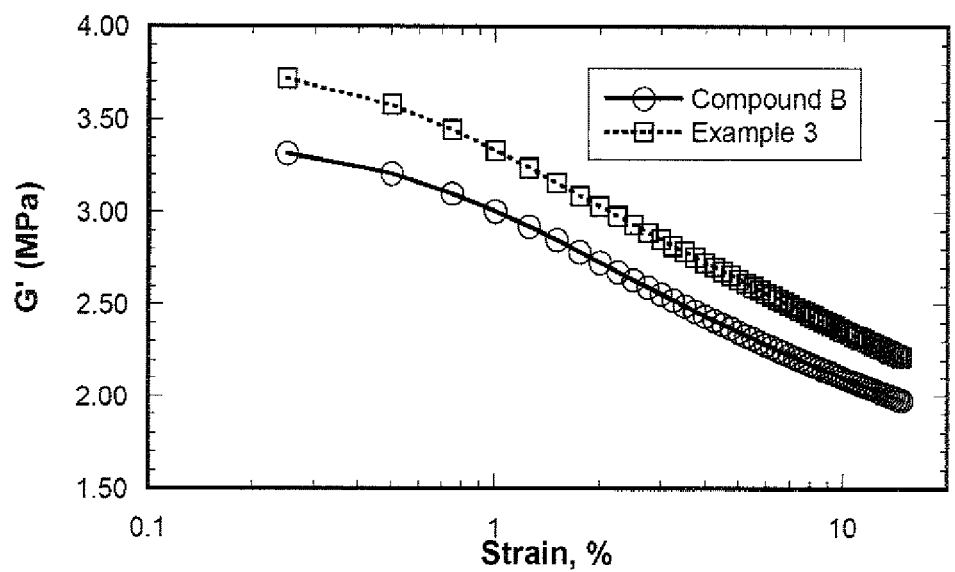
FIG. 2 illustrates a graph showing dynamic storage modulus as a function of strain for Example 3.

The dynamic storage modulus is reported in Table 6 and shows that the stock containing feather meal has a 20% increase compared to that of the control. The G' strain dependences of Example 3 and Comparative Example B are shown in FIG. 2, where similar dependences were found among the two with the enhanced G' in Example 3.

It was also found that with the 20% increase in dynamic modulus, in Example 3 there was little or no drop oft in the 50° C. and 0° C. tan δ. In fact, the Stanley London of stock 2 with feather meal shows higher value.

It was surprising to find that with the addition of 10 phr of feather meal in Compound 3, the Mooney viscosity was increased only moderately. This increase is comparatively smaller than would be expected based on the addition of a similar loading of other rigid fillers into rubber compounds and is still acceptable for processing. It was also surprising to find that with addition of feather meal the elongation at break (Eb) was decreased only moderately. This decrease is comparatively smaller than would be expected based on the addition of a similar fibrous additives into rubber compounds such as KEVLAR, fiberglass, and nylon 6 or nylon 66.

The tensile mechanical properties were measured using the standard procedure described in the ASTM-D 412 at 25° C. Samples with two different geometries were used for the tests. One group of samples were prepared in the form of round rings with outer diameters of 18.0 mm, inner diameters of 15.5 mm and 1.9 mm in thickness. A specific gauge length of 25.4 mm was used for the ring tensile tests. The tensile test results shown in Table 6 had reduced high strain tensile mechanical properties that were similar to that which was seen with the ground chicken feather of Examples 1 and 2.

The description has been provided with exemplary embodiments. Obviously, modifications and alterations will occur to others upon reading and understanding the preceding detailed description, it is intended that the exemplary embodiments be construed as including all such modifications and alterations insofar as they come within the scope of the appended claims or the equivalents thereof.

It is claimed:

1. A method comprising: mixing together
   (a) an elastomer having an elongation at break (Eb) of about 50% or more according to ASTM-D 412 at 25° C. and
   (b) keratin, wherein the keratin is feather meal.

2. The method of claim 1, further comprising: processing the mixture comprising the elastomer and the keratin into a tire component.

3. The method of claim 1, further comprising mixing a coupling agent to couple the keratin to the elastomer.

4. The method of claim 1, further comprising chemically binding the keratin to the elastomer with a coupling agent.

5. The method of claim 1, further comprising coupling the elastomer and the keratin with a glycidal silane coupling agent.

6. The method of claim 1, further comprising mixing a reinforcing filler comprising carbon black.

7. The method of claim 1, further comprising mixing in a processing aid.

8. The method of claim 7, wherein the feather meal includes the processing aid.

9. The method of claim 1, wherein the keratin is β keratin.

10. The method of claim 1, wherein the amount of keratin is from about 4 to about 50 phr.

11. The method of claim 1, wherein the keratin is in the form of particles or fibers, and wherein the keratin has a diameter of from about 1 μm to about 500 μm, and a length of from about 0.05 mm to about 10 mm.

12. The method of claim 1, further comprising a coupling agent that is an organosilane polysulfide.

13. The method of claim 1, further comprising 3-glycidoxy-propyl-trimethoxy silane.

14. The method of claim 7, wherein said processing aid includes glycerol.

15. The method of claim 1, further comprising vulcanizing the elastomer.

16. The method of claim 1, wherein said elastomer is selected from the group consisting of styrene-butadiene rubber, natural rubber, polyisoprene rubber, butadiene rubber, styrene-isoprene rubber, isoprene-butadiene rubber, styrene-isoprene-butadiene rubber, and blends thereof.

17. The method of claim 1, further comprising mixing together with components (a) and (b) a reinforcing filler selected from the group consisting of silica, carbon black, and mixtures thereof.

18. The method of claim 17, wherein the reinforcing filler is carbon black.

* * * * *